(12) United States Patent
Rastegar et al.

(10) Patent No.: US 8,110,785 B2
(45) Date of Patent: Feb. 7, 2012

(54) MECHANICAL STEPPER MOTORS FOR GUN-FIRED PROJECTILES, MORTARS AND MISSILES

(75) Inventors: Jahangir S. Rastegar, Stony Brook, NY (US); Thomas Spinelli, East Northport, NY (US)

(73) Assignee: Omnitek Partners LLC, Ronkonkoma, NY (US)

( * ) Notice: Subject to any disclaimer, the term of this patent is extended or adjusted under 35 U.S.C. 154(b) by 768 days.

(21) Appl. No.: 12/217,605

(22) Filed: Jul. 7, 2008

(65) Prior Publication Data

US 2010/0275805 A1    Nov. 4, 2010

Related U.S. Application Data

(60) Provisional application No. 60/958,947, filed on Jul. 10, 2007.

(51) Int. Cl.
*B64C 13/00* (2006.01)
*F42B 10/64* (2006.01)

(52) U.S. Cl. ................ 244/3.24; 244/45 A; 244/99.2

(58) Field of Classification Search ............... 244/3.24, 244/3.25, 91, 45 A, 99.2, 99.3, 99.5, 99.6; 102/501
See application file for complete search history.

(56) References Cited

U.S. PATENT DOCUMENTS 3,603,259 A * 9/1971 Webb ..................... 102/235
5,806,791 A * 9/1998 Hatalsky et al. ......... 244/3.24

FOREIGN PATENT DOCUMENTS

DE    3205 153 A1 * 9/1983
* cited by examiner

*Primary Examiner* — Rob Swiatek

(57) ABSTRACT

A projectile including: a body having an internal space; and a mechanical stepper motor disposed in the body. The mechanical stepper motor including: a shuttle having one of a plurality of pockets and movable pins offset from each other with a first spacing; a body portion having the other of the plurality of pockets and movable pins offset from each other with a second spacing, where the first spacing is different from the first spacing; and actuation means for engaging at least one of the movable pins into a corresponding pocket to step one of the shuttle and body portion a predetermined linear and/or rotary displacement.

21 Claims, 10 Drawing Sheets

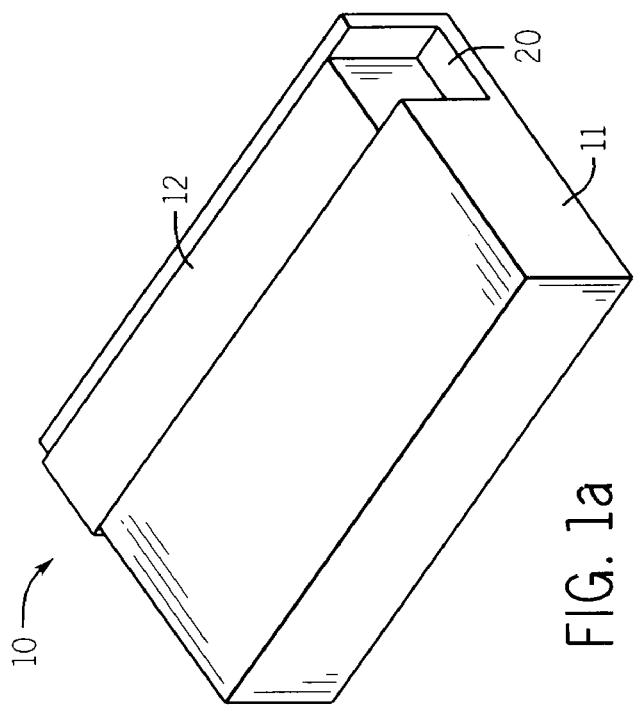
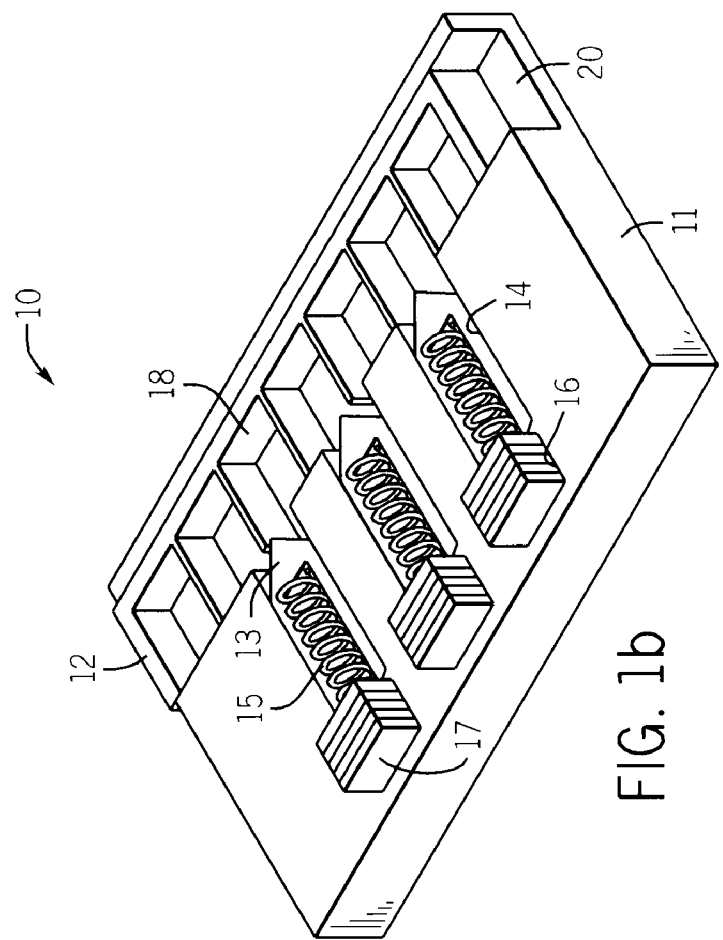
FIG. 1a
FIG. 1b

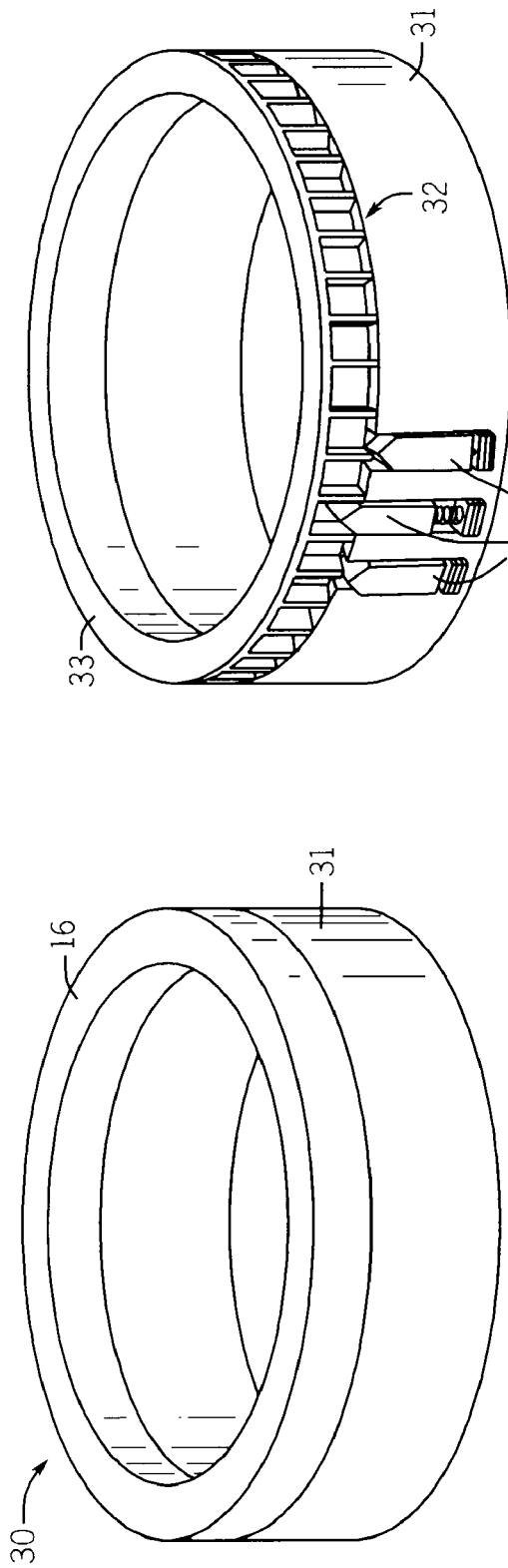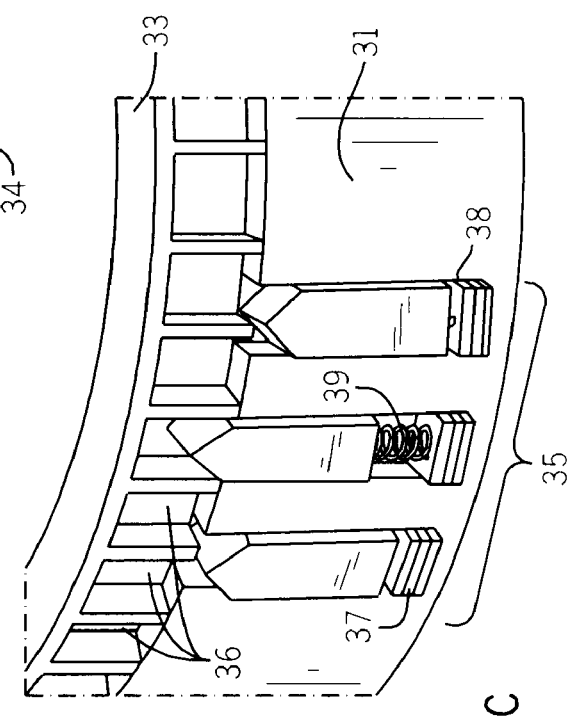
FIG. 4a
FIG. 4b
FIG. 4c

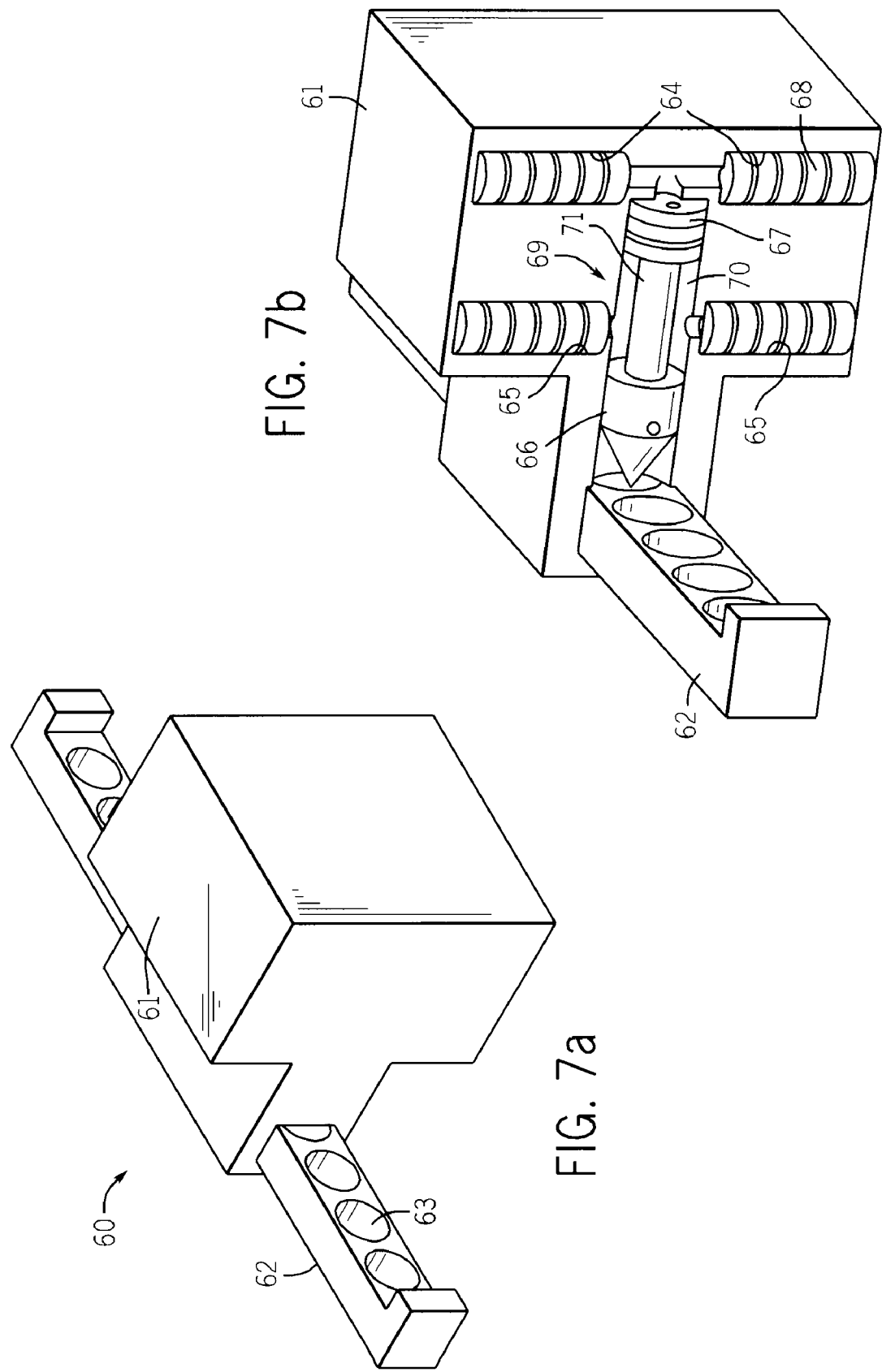

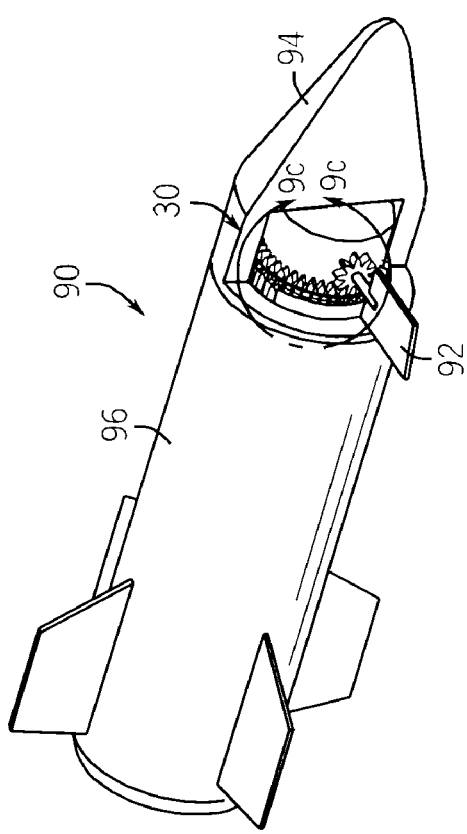
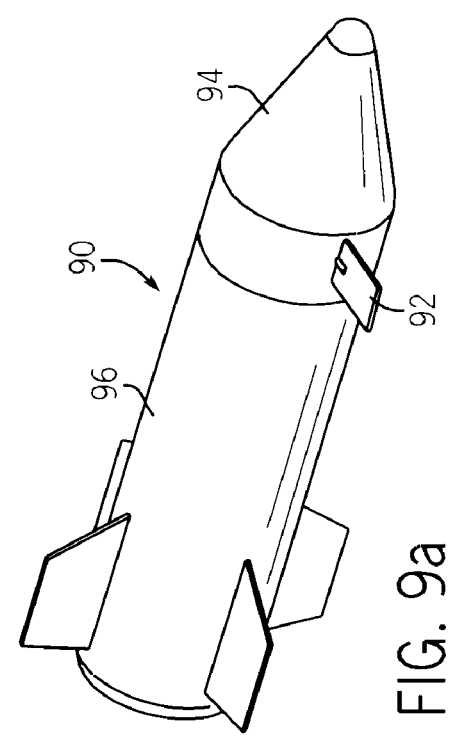
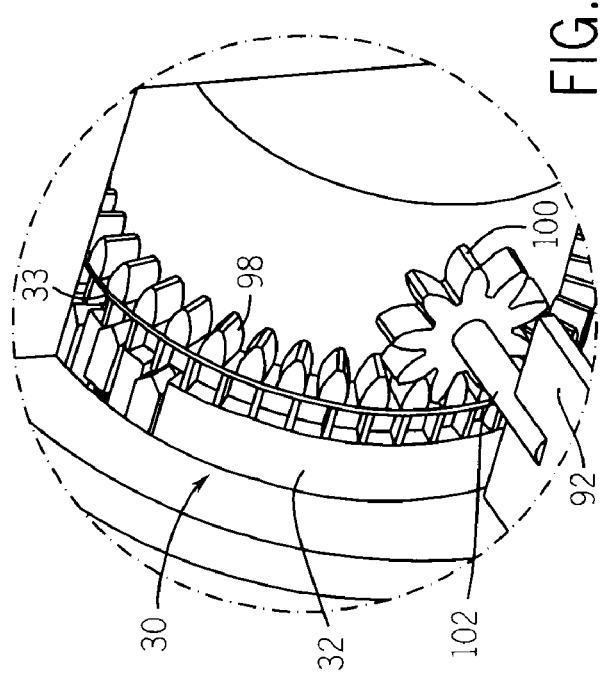
FIG. 9a
FIG. 9b
FIG. 9c

US 8,110,785 B2

MECHANICAL STEPPER MOTORS FOR GUN-FIRED PROJECTILES, MORTARS AND MISSILES

CROSS-REFERENCE TO RELATED APPLICATION

This application claims benefit to U.S. Provisional Application 60/958,947 filed Jul. 10, 2007, the entire contents of which is incorporated herein by reference.

BACKGROUND OF THE INVENTION

1. Field of the Invention

The present invention relates generally to actuators, and more particularly to mechanical stepper motor like actuators. The actuators are particularly suitable for actuating control surfaces in gun-fired projectiles, mortars and missiles.

2. Prior Art

Since the introduction of 155 mm guided artillery projectiles in the 1980's, numerous methods and devices have been developed for the guidance and control of subsonic and supersonic gun launched projectiles. The majority of these devices have been developed based on missile and aircraft technologies, which are in many cases difficult or impractical to implement on gun-fired projectiles and mortars. This is particularly true in the case of actuation devices, where electric motors of various designs have dominated the guidance and control of most guided weaponry.

In almost all guided weaponry, such as rockets, actuation devices and batteries used to power the same, occupy a considerable amount of the weaponry's internal volume. In recent years, alternative methods of actuation for flight trajectory correction have been explored, some using smart (active) materials such as piezoelectric ceramics, active polymers, electrostrictive materials, magnetostrictive materials or shape memory alloys, and others using various devices developed based on microelectromechanical (MEMS) and fluidics technologies.

In general, the available smart (active) materials such as piezoelectric ceramics, electrostrictive materials and magnetostrictive materials need to increase their strain capability by at least an order of magnitude in order to become potential candidates for actuator applications for guidance and control, particularly for gun-fired munitions and mortars. In addition, even if the strain rate problems of currently available active materials are solved, their application to gun-fired projectiles and mortars will be very limited due to their very high electrical energy requirements and the volume of the required electrical and electronics gear. Shape memory alloys have good strain characteristics but their dynamic response characteristics (bandwidth) and constitutive behaviour need significant improvement before becoming a viable candidate for actuation devices in general and for munitions in particular.

The currently available and the recently developed methods and devices or those known to be under development for guidance and control of airborne vehicles such as missiles, have not been shown to be suitable for gun-fired projectiles and mortars. In fact, none have been successfully demonstrated for gun-fired guided munitions, including gun-fired and mortar rounds. This has generally been the case since almost all the available guidance and control devices and methodologies suffer from one or more of the following major shortcomings for application in gun-fired projectiles and mortars:

1. Limited control authority (generated force or torque) and high speed actuation capability (dynamic response characteristics or "bandwidth"), considering the dynamics characteristics of gun-fired projectiles and mortars.
2. Reliance on battery-based power for actuation in most available technologies and the requirement of a considerable amount of electrical power for their operation.
3. The relatively large volume requirement for the actuators, batteries and their power electronics.
4. The high cost of the existing technologies, which results in very high-cost rounds, thereby making them impractical for large-scale fielding.
5. Survivability problems of many of the existing devices at high-g firing accelerations and reliability of operation post firing, particularly at very high setback accelerations of over 60,000 Gs.
6. Relative technical complexities involved in their implementation in gun-fired projectiles and mortars.

A need therefore exists for actuation technologies that address these restrictions in a manner that leaves sufficient volume onboard munitions for sensors, guidance and control and communications electronics and fuzing as well as the explosive payload to satisfy lethality requirements.

Such actuation devices must consider the relatively short flight duration for many of the gun-fired projectiles and mortar rounds, which leaves a very short time period within which trajectory correction has to be executed. Such actuation devices must also consider problems related to hardening components for survivability at high firing accelerations and the harsh environment of firing. Reliability is also of much concern since the rounds need to have a shelf life of up to 20 years and could generally be stored at temperatures in the range of −65 to 165 degrees F.

In addition, for years, munitions developers have struggled with placement of components, such as sensors, processors, actuation devices, communications elements and the like within a munitions housing and providing physical interconnections between these components. This task has become even more prohibitive considering the current requirements of making gun-fired munitions and mortars smarter and capable of being guided to their stationary and moving targets, therefore requiring high power consuming and relatively large electrical motors and batteries. It is, therefore, important for all guidance and control actuation devices, their electronics and power sources not to significantly add to the existing problems of integration into the limited projectile volume.

SUMMARY OF THE INVENTION

Accordingly, a projectile is provided. The projectile comprising: a body having an internal space; and a mechanical stepper motor disposed in the body. The mechanical stepper motor comprising: a shuttle having one of a plurality of pockets and movable pins offset from each other with a first spacing; a body portion having the other of the plurality of pockets and movable pins offset from each other with a second spacing, where the first spacing is different from the first spacing; and actuation means for engaging at least one of the movable pins into a corresponding pocket to step one of the shuttle and body portion a predetermined linear and/or rotary displacement.

The mechanical stepper motor can be disposed in the internal space. The mechanical stepper motor can be provided on the body. A portion of the mechanical stepper motor can be integral with the body.

The mechanical stepper motor can be operatively connected to a portion of the body. The portion of the body can be a control surface and the mechanical stepper motor can be operatively connected to control the control surface. The control surface can be a canard.

The predetermined displacement can be linear. In which case, the body portion can comprise a shuttle guide for movably holding the shuttle and pin guides for movably holding the pins.

The predetermined displacement can be rotary. In which case, the body portion can comprise pin guides for movably holding the pins and the shuttle can be rotatably disposed on the body portion and comprises the pockets.

The activation means can comprise one or more detonation charges for producing a pressurized gas acting on at least one of the pins to one of engage and disengage the pins with a pocket. The projectile can further comprise a biasing means for biasing the at least one pin in a disengaged position, wherein the activation means can further comprise a vent hole for releasing the pressurized gas from acting on the pin and allowing the biasing means to disengage the at least one pin from the pocket. The one or more detonation charges can be provided in a space in direct communication with a portion of the at least one pin. The one or more detonation charges can be provided to pressurize a reservoir in fluid communication with a portion of the at least one pin through one or more valves.

The activation means can comprise one or more of the pins having a first portion acted upon by a first pressurized gas to engage the one or more pins and a second portion acted upon a second pressurized gas to disengage the one or more pins. The first pressurized gas can be provided by one or more first detonation charges and the second pressurized gas is provided by one or more second detonation charges. The first and second detonation charges can be disposed in the body.

The activation means can comprise a pressurized fluid source in fluid communication with a portion of the at least one pin through one or more valves. The pressurized fluid source can be one of air and hydraulic fluid.

The projectile can further comprise locking means for locking a position of one of the shuttle and body relative to the other.

Also provided is a method for stepping a first member relative to a second member associated with a projectile. The method comprising: providing one of the first and second members with one of a plurality of pockets and movable pins offset from each other with a first spacing; providing the other of the first and second members with the other of the plurality of pockets and movable pins offset from each other with a second spacing, where the first spacing is different from the first spacing; and engaging at least one of the movable pins into a corresponding pocket to step one of the first and second members a predetermined linear and/or rotary displacement.

The engaging can comprise producing pressurized gas acting on at least one of the pins to engage the pins with at least one of the pockets. The method can further comprise: biasing the at least one pin in a disengaged position; and releasing the pressurized gas from acting on the pin and allowing the biasing to disengage the at least one pin from the pocket. The pressurized gas can be produced in a space in direct communication with a portion of the at least one pin. The pressurized gas cam be produced to pressurize a reservoir in fluid communication with a portion of the at least one pin through one or more valves. The pressurized gas can be produced to engage the one or more pins and to disengage the one or more pins.

The engaging can comprise providing a pressurized fluid source in fluid communication with a portion of the at least one pin through one or more valves.

The method can further comprise locking a position of one of the shuttle and body relative to the other.

BRIEF DESCRIPTION OF THE DRAWINGS

These and other features, aspects, and advantages of the apparatus of the present invention will become better understood with regard to the following description, appended claims, and accompanying drawings where:

FIG. 1a illustrates an overall view of a linear mechanical stepper motor type linear actuator.

FIG. 1b illustrates a cutaway view of the linear mechanical stepper motor like actuator of FIG. 1a showing its internal components.

FIG. 4a illustrates an overall view of a rotary mechanical stepper motor like actuator.

FIG. 4b illustrates a cutaway view of the rotary mechanical stepper motor like actuator of FIG. 4a.

FIG. 4c illustrates a close-up view of the cutaway view of the rotary mechanical stepper motor like actuator of FIG. 4b.

FIG. 7a illustrates an overall view of a linear mechanical stepper motor like actuator with double acting actuating pins and at least one laterally positioned detonation charges.

FIG. 7b illustrates a cutaway view of the linear mechanical stepper motor like actuator of with double acting actuating pins and at least one laterally positioned detonation charges of FIG. 7a.

FIG. 9a illustrates a projectile having a canard movable by a rotary mechanical stepper motor.

FIG. 9b illustrates the projectile of FIG. 9a having a partial sectional showing the rotary mechanical stepper motor.

FIG. 9c illustrates an enlarged view of the rotary mechanical stepper motor of FIG. 9b.

DETAILED DESCRIPTION OF THE PREFERRED EMBODIMENT

Figure 2:
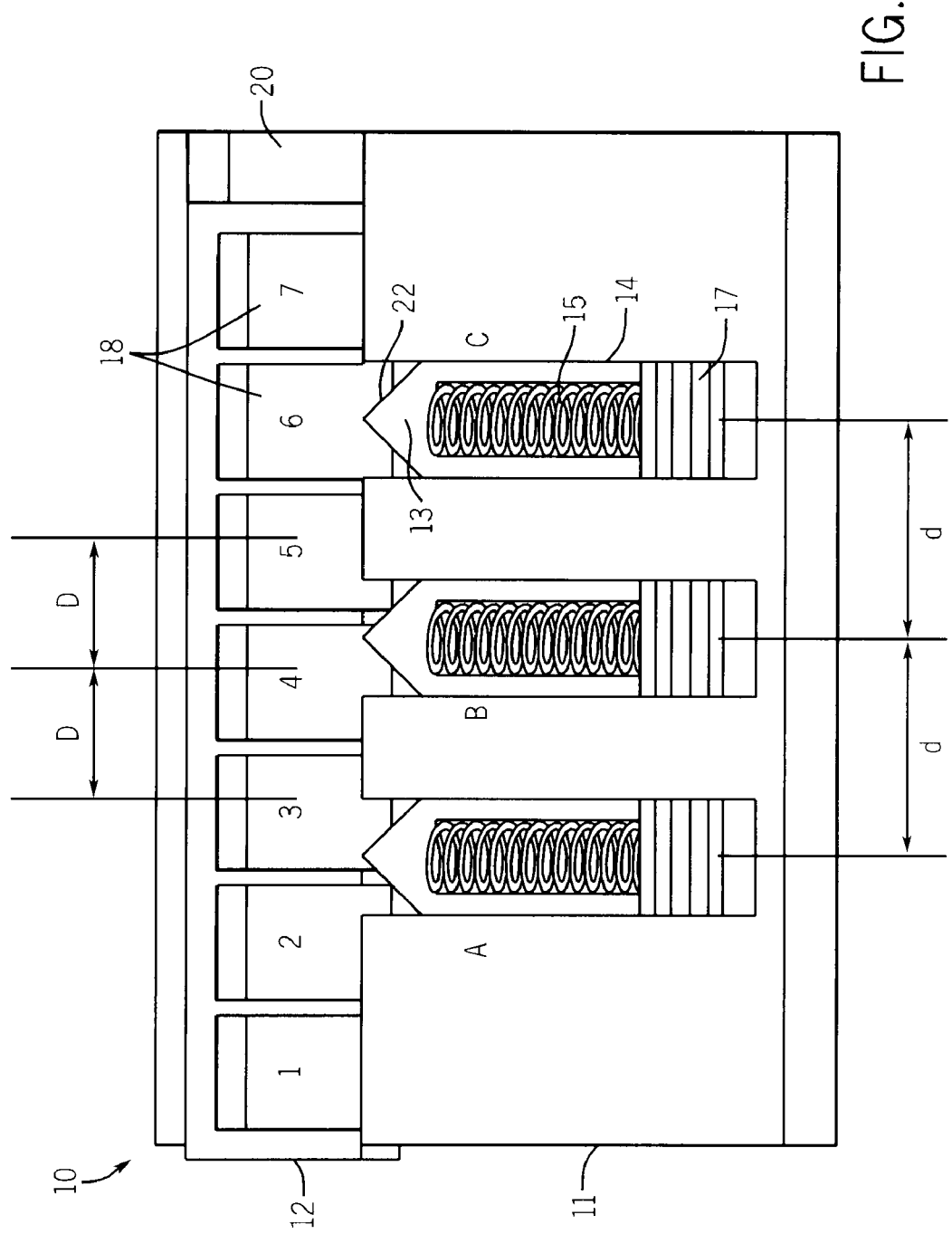
FIG. 2 illustrates a frontal view of the linear mechanical stepper motor like actuator of FIGS. 1a and 1b.

Although the present invention is applicable to numerous types of actuators, it is particularly useful in the environment of actuators for gun-fired projectiles, mortars and missiles.

Therefore, without limiting the applicability of the present invention to actuators for gun-fired projectiles, mortars and missiles, it will be described in such an environment. Further, the disclosed actuators can also be used anywhere a stepper motor (rotary and/or linear) can be used, such as in manufacturing and inspection processes and robotics. A particular useful application for the disclosed mechanical stepper motors is in linear and rotary indexing tables.

The disclosed "mechanical stepper motor" like actuation devices can be designed to provide very high force (torque) compared to similar sized electrical linear (rotary) motors. The actuators can also be designed with very high dynamic response characteristics. The high force (torque) and high dynamic response characteristics of the disclosed "mechanical stepper motor" like actuation devices make them particularly suitable for gun-fired projectile, mortar and missile guidance and control applications. The disclosed actuation technology can be used to construct linear as well as rotary actuation devices, particularly those for actuating flight control surfaces such as fins and canards in gun-fired projectiles, mortars and missiles. In fact, the disclosed actuation technology can also be used to construct actuation devices powering devices with arbitrary curved motion paths, including circular arcs.

The actuators disclosed herein require minimal volume since they can be powered by pressurized gas, such as the detonation of embedded charges that could provide high internal pressures and thereby high actuating forces/torques and high dynamic response, particularly larger than those possible by other actuation devices, such as electrical motors. With the disclosed actuation technology, since solid charges have energy densities that are orders of magnitude higher than the best available batteries, a very significant total volume savings is also achieved by the elimination of batteries that are required to power electrically powered actuation devices.

It is also noted that the disclosed "mechanical stepper motor" like actuation devices require minimal electrical power to operate since they are based on detonation of embedded charges and that charges can be detonated using as little as 3-5 mJ of electrical energy. It is also noted that by significantly reducing the amount of electrical energy that is needed for actuation purposes, it may become possible to utilize energy harvesting power sources for their operation, thereby eliminating the need for chemical batteries in certain applications.

The disclosed "mechanical stepper motor" like actuation devices are capable of being embedded into the structure of the projectile, mostly as load bearing structural components, thereby occupying minimal projectile volume. In addition, the actuation devices and their related components are better protected against high firing acceleration loads, vibration, impact loading, repeated loading and acceleration and deceleration cycles that can be experienced during transportation and loading operations.

Some of the features of the disclosed "mechanical stepper motor" like actuation devices for gun-fired projectiles, mortars and missiles and the like include:

1. The disclosed actuators can have very high control authority and very high dynamic response characteristics since they are based on detonations of charges and utilization of the generated high detonation pressures to drive the actuation devices. For example, such a linear actuator operating at a detonation pressure of around 5,000 psi and with a pressure surface of 0.5 square inches would readily provide a force of around 10,000 N. A rotary actuator with a similar sized pressure area with an effective diameter of 2 inches and operating at 5,000 psi could readily produce a torque of around 250 N-m. In addition, reliable detonation within time periods of 5-10 msec and even significantly lower with nanoenergetic materials based ignition can be readily achievable. This allows motion steps at a rate of at least 100-200 Hz (cycles per second). For these reasons, the proposed actuators are particularly well-suited for guidance and control of precision gun-fired projectiles, mortars and missiles.

2. The disclosed actuators can require very low electrical power for operation. A large amount of projectile volume is therefore saved by the elimination of large battery-based power sources that are required for electrical actuation devices such as electrical motors and solenoid type actuation devices. Furthermore, by significantly reducing the power requirement, it is possible to use onboard energy harvesting power sources and thereby totally eliminating the need for onboard chemical batteries. As a result, safety and shelf life of the projectile is also significantly increased.

3. The disclosed actuators can be significantly lighter than electrical actuation devices that are commonly used for guidance and control and occupy very small useful volume of the projectile. This is the case since the disclosed actuators are high torque/force, fast acting (have high dynamic response characteristics) and may be integrated into the structure of the projectile as load bearing structures. The latter characteristic is also advantageous from the guidance and control point of view since the actuation force (torque) is applied directly to the round structure without intermediate components. Almost all such intermediate coupling mechanisms also introduce flexibility between the control force (torque) and the projectile structure, thereby reducing the performance of the feedback control system.

4. The disclosed rotary actuators can be designed in an arc form to provide a desired range of angular rotation. The actuators may also be designed to provide motion along arbitrarily varying curved paths without any intermediate cams or other similar components.

5. The disclosed actuators can operate as stepper motors, but the actuators have the added advantage of being mechanical, herein referred to as "mechanical stepper motors", and capable of being locked following each motion step, and would therefore require no sensors to close a feedback loop for proper positioning.

6. Due to the capability of the disclosed actuators to be integrated into the structure of the projectile and their unique design, they can be readily hardened to survive very high-g firing loads and very harsh environment of firing. The disclosed actuators will therefore provide highly reliable devices for use in gun-fired projectiles, mortars and missiles.

7. The disclosed actuators can be built as modular units and can thereby form the basis for developing a common actuator solution for almost all gun-fired projectiles, mortars and missiles and the like for actuating control surfaces and the like.

8. The disclosed actuators can be very simple in design, and can be constructed with very few moving parts and no ball bearings or other similar joints, thereby making them highly reliable even following very long storage times of over 20 years.

9. The disclosed actuators are scalable to almost any small or large force/torque requirements.

10. The disclosed actuators can be designed to conform to almost any geometrical shape of the structure of the projectile and the available space within the projectile housing.
11. The disclosed actuators are capable of withstanding high vibration, impact and repeated loads due to their design integration into the structure of the projectile.
12. The disclosed actuators can be very simple in design and utilize mostly existing manufacturing processes and components. As a result, they can provide the means to develop highly effective but low cost guidance and control systems for guided gun-fired projectiles, mortars and missiles.
13. The disclosed actuators can provide cost effective means to significantly increase munitions precision and thereby the probability of a hit.
14. The disclosed actuators can be used in both subsonic and supersonic projectiles.

The disclosed actuators have a wide range of military and commercial applications, particularly when powered pneumatically and even hydraulically, as mechanical stepper motors with position locking capability.

The disclosed "mechanical stepper motor" type actuators and their basic operation and methods of their design and manufacture and integration into the structure of projectiles will now be described in detail by linear mechanical stepper motor design shown in FIGS. 1a and 1b. It is shown that the disclosed actuators would provide very cost effective and have high actuation force/torque and dynamic response characteristics, while occupying very small useful projectile volume and requiring very low electrical power. It is also shown that the disclosed actuators can be capable of being readily scaled to the desired application. The disclosed actuator concepts could be built as modular units and could form the basis for developing a common actuator solution for any gun-fired projectile, mortar or missile.

In addition, different methods of powering and driving the disclosed actuation devices are described.

Furthermore, methods of obtaining multistep actuation devices with one or more coarse and fine step sizes to achieve the desired speed and positioning precision are described.

An overall view of the basic linear mechanical stepper motor type linear actuator 10 is shown in FIG. 1a. The cutaway view of the actuator 10 showing its internal components is shown in FIG. 1b. The linear mechanical stepper motor 10, FIG. 1a, hereinafter also referred to simply as a linear motor, a linear actuator or a linear stepper motor, consists of two major parts, a body 11 (the stationary part of the linear motor) and a shuttle 12 (the linearly translating part of the linear motor). In the munitions applications, the body of the linear motor is preferably an integral part of the projectile structure as a load-bearing structure of the projectile, thereby allowing the linear motor to occupy minimal internal volume.

The cutaway view of the linear motor 10 is shown in FIG. 1b. The shuttle 12 is seen to be provided with equally spaced pockets 18 facing downward towards the base of the linear motor 10. The shuttle 18 is provided with a guide 20 for its linear translation inside the linear motor body 11. Within the linear motor body 11 are also provided with at least three equally spaced detonation activated actuator "pins" 13. The actuator pins 13 are provided with matching guides 14 in the actuator body 11 within which they could translate. In the design shown in FIGS. 1a and 1b, the actuator pins 13 are biased downward by return tensile springs 15 as shown in FIG. 1b, positioning them normally in a disengaged position with respect to the shuttle pockets 18 as seen in FIG. 1b.

In the design shown in FIGS. 1a and 1b, a number of layers of denotation charges 17 are provided in a space 16 under the actuator pins 13. The layers of detonation charges 17 may be detonated electronically (not shown) in a sequential manner by the actuator controller unit (not shown). The detonation and timing of detonation charges and the electronics therefore are well known in the art. The basic operation of the high force/torque and high dynamic response mechanical linear stepper motor 10 is described below.

The operation of the disclosed class of mechanical linear stepper motor like actuator 10 is best described by the schematic of FIG. 2, which is in effect the frontal cutaway view of the basic components of the linear actuator 10 shown in FIGS. 1a and 1b. The operation of this class of stepper motor like actuators is based on the principles of operation of simple Verniers. A Vernier (also called a Vernier scale) is "A small, movable auxiliary graduated scale attached parallel to a main graduated scale, calibrated to indicate fractional parts of the subdivisions of the larger scale, and used on certain precision instruments to increase accuracy in measurement" (The Free Dictionary by Farlex, Inc., 1051 County Line Road Suite 100, Huntingdon Valley, Pa. 19006).

In the linear mechanical stepper (motor) actuator 10, the shuttle 12 of the actuator is provided with pockets 18 (numbered 1 through 7 in FIG. 2) that are positioned a distance D apart as is shown in FIG. 2. Three actuating pins 13 (indicated with letters A, B and C) are sized to closely fit the shuttle pockets 18, can translate in the guides 14 provided in the actuator body 11, and are positioned a distance d apart where d>D. Let $$d-D=\delta \qquad (1)$$

Figure 3B:
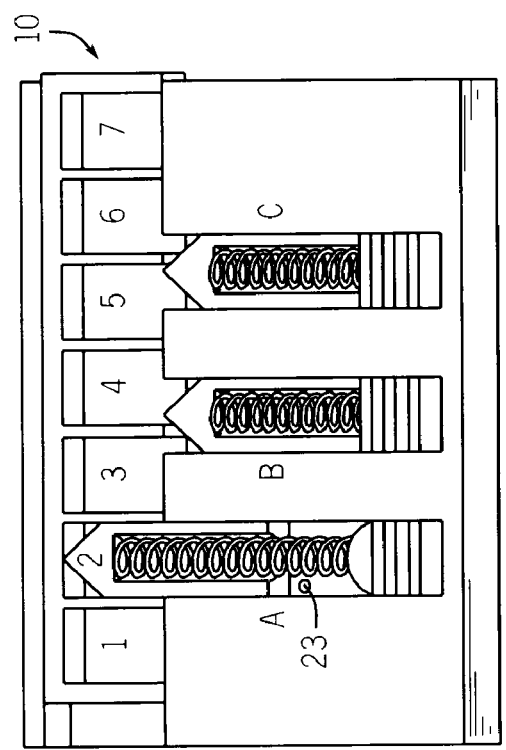
FIG. 3b illustrates a frontal view of the linear mechanical stepper motor like actuator of FIGS. 1a and 1b with the pin B actuated to move the shuttle one more step to the right.
Figure 3C:
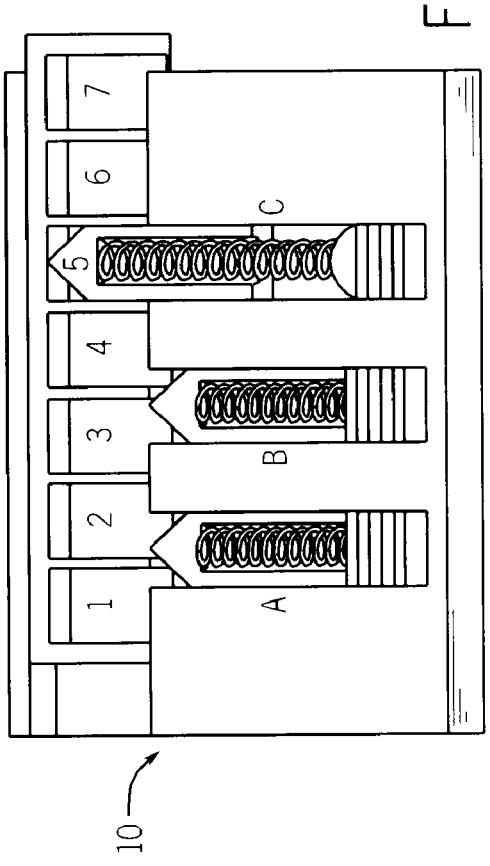
FIG. 3c illustrates a frontal view of the linear mechanical stepper motor like actuator of FIGS. 1a and 1b with the pin A actuated to move the shuttle one more step to the right.
Figure 3A:
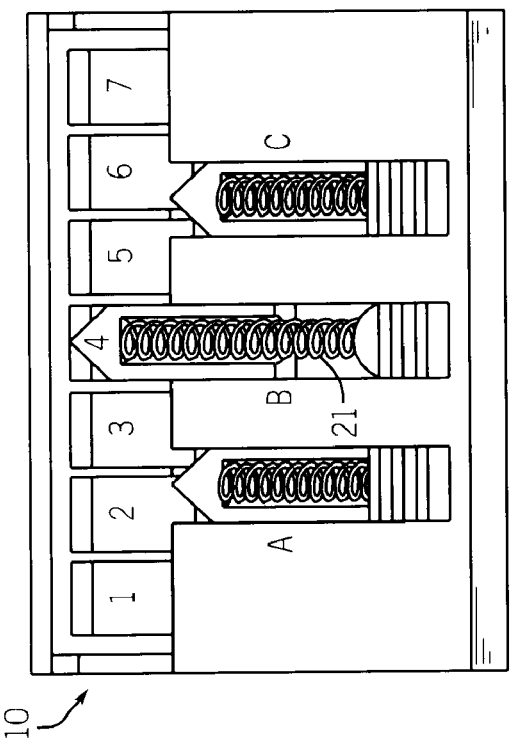
FIG. 3a illustrates a frontal view of the linear mechanical stepper motor like actuator of FIGS. 1a and 1b with the pin C actuated to move the shuttle one step to the right.

Now consider the situation in which the actuator pin C has been pushed into the pocket 6, thereby lining up the shuttle 12 above the actuator body 11, followed by the withdrawal of the pin C, as can be seen in FIG. 2. Now by pushing the actuator pin B up into the pocket 4 as shown in FIG. 3a, the pocket 4 is then lined up with the actuator pin B, thereby advancing the actuator shuttle 12 one step to the right. To advance the actuator shuttle 12 one more step to the right, the actuator pin A is pushed up into the pocket 2 of the actuator shuttle 12 as shown in FIG. 3b and then retracted. At this point, the actuator pin C may be pushed into the actuator pocket 5 as shown in FIG. 3c and then retracted, thereby moving the actuator shuttle 12 one more step to the right. At this point, the shuttle 12 pockets 18 are in a similar position over the actuator pins as they were initially as shown in FIG. 2, with the difference of having been advanced one full pocket distance D to the right. By repeating the above sequence of pin A, B and C actuation, the actuator shuttle 12 can be moved further steps to the right. The pins A, B and C are pushed into the pockets by detonation of one or more of the detonation charges 17.

The actuator shuttle 12 may be moved similarly a desired number of steps to the left, starting from any one of the shuttle 12 positions shown in FIG. 2 or 3. For example, starting from the shuttle 12 position shown in FIG. 2, the shuttle is moved one step to the left by actuating the pin A into the pocket 3. The second step to the left is then achieved by actuating the pin B into the pocket 5. The next step to the left is then achieved by actuating the pin C into the pocket 7.

It is noted that in the linear actuator 10, the upward motion of the actuator 10 pins 13 is shown to be achieved by the detonation of one layer of the charges 17 provided in the space 16 under the selected actuator 10 pins 13, followed by the discharge of the pressurized gases in the compartment 21 under each actuator 10 pin 13 and the pulling back of the actuator 10 pin 13 by the provided tensile spring element 15.

This may be readily achieved by the provision of exhaust vents (shown for example in FIG. 3b corresponding to only pin B but which would be used for each of the pins) that are positioned such that in their resting position, the pins 13 cover the vent hole(s) 23. Then once actuated, the pins 13 pass the vent hole(s), thereby allowing the generated pressurized gases to substantially escape through the vent hole(s) 23, thereby allowing the tensile return springs to return the pin to its resting position.

It is readily seen that by varying the distance d (FIG. 2) and thereby the difference δ, equation (1), the step size of the present mechanical linear actuator 10 can be varied. In a similar manner, as is expected from the present Vernier-based stepper motor like linear actuator 10, more than three actuation pins 13 and larger or smaller differences δ may be used to achieve almost any stepper motor step size.

In a second embodiment, more than one set of actuation pins 13 can be provided which operate independent of each other and may be positioned in line or parallel to each other, i.e., one set behind the other, to achieve two or more step sizes to, for example, course step and fine step sizes. In such a configuration, a shuttle 12 may be provided corresponding to each set of pins 13 or a single shuttle 12 may be used having two sets of pockets 18 (one corresponding to each of the sets of pins 13).

In addition, for the same body 11 and a shuttle 12 with different pocket distance D, the step size is readily varied within a certain limit indicated by the size of the pin 13 angled tips 22, FIG. 2, which would still allow sequential operation of the pins 13.

Alternatively, a modular actuation pin portion that is shown embedded in the body 11 of the actuator 10, FIGS. 1-3, may be constructed separately and be attached to the actuator body 10 with the same positioning relative to the guide 20 to similarly actuate the shuttle 12. In such a design, by selecting actuator portions with different pin spacing d, the step size of the linear motor is similarly varied.

Alternatively, each actuating pin assembly may be constructed separately and then attached to the actuator 10 body 11 with a desired pin spacing d, to achieve the desired step size for the linear stepper (motor) actuator 10.

Alternatively, it is readily observed that the body 11 of the present mechanical linear stepper (motors) actuators 10 can be an integral part of the structure of the projectile as a load bearing component. As such, one only needs to machine the guide 20 for the aforementioned shuttle 12, position the shuttle 12 in place and attach a modular actuator pin unit in place to complete the assembly of the mechanical components of the actuator into the structure of the projectile.

Alternatively, the guide 20 may be a separate modular component that is attached to the body of the projectile, for example, via fasteners such as screws. The pin assembly or individual pin assemblies may then be attached separately to the body of the projectile to achieve the desired shuttle 12 motion.

It is also appreciated by those skilled in the art that the maximum step size of the disclosed stepper motor like actuators is dependent and limited by the width of the actuating pin 13 tip 22 (base diameter of the pin 13 tip 22 cone if a conical tip 22 is used).

It is also appreciated by those skilled in the art that with any size width of the actuating pin 13 tip 22 (or based diameter of the pin 13 tip 22 cone if a conical tip 22 is used), any desired pin spacing d, thereby any desired step size δ may be achieved, FIG. 2. However, when the width of the actuating pin 13 tip 22 (or based diameter of the pin 13 tip 22 cone if a conical tip 22 is used) is relatively larger and the desired pin spacing d is relatively small such that the pins may overlap each other if are positioned side by side in a single plane, then the pins have to be positioned back and forth enough to clear each other, for example the pin B in FIG. 2 may be positioned in the back (or in the front) (i.e., further in or out of the page) of the pins A and C to allow for larger actuating pin 13 tip 22 to be positioned between the pins A and C. The width of the shuttle 12 must then be appropriately increased to allow for the required number of rows of pockets 18 (in the example two rows of pockets 18) to be provided in the shuttle 12.

It is noted that the above description of the design and operation of the stepper motor like linear actuator (motor) is provided mainly with the objective of describing the method of design and basic principles of operation of the disclosed "mechanical stepper motors". In the following part of the present disclosure, other embodiments of the disclosed "mechanical stepper motors" and their different possible implementations and operational characteristics are described.

Also, more than one row of pockets 18 may be provided on the shuttle 12 with a corresponding set of pins 13 provided for each row. For example, two such rows of pockets 18 can be provided in the shuttle 12 with two sets of pins 13. The width of the actuating pins 13 tip 22 and/or pin spacing d, can be varied between sets of pins/pockets to have a different step size δ for each set of pins. In this way, one of the sets of pins/pockets can be used to step the shuttle in a coarse adjustment and the other set of pins/pockets can be used to step the shuttle in a fine adjustment.

In FIGS. 1-3, the disclosed method of developing mechanical stepper motors is presented for the case of a linear stepper actuator (motor). It is, however, appreciated by those skilled in the art that the disclosed method can be readily used to design rotary mechanical stepper type actuators (motors) with partial or full range of rotations such as the rotary actuator 30 shown in FIGS. 4a-4c. The rotary stepper motor type mechanical actuator 30 is designed to provide full rotary motion. The rotary actuator 30 consists of a circular body 31 with provided circularly positioned guide 32 with circularly shaped shuttle 33 to ride inside the guide 32 as shown in FIGS. 4a-4c.

The overall view of such a rotary mechanical stepper motor (actuator) 30 is shown in FIG. 4a, with a cutaway view shown in FIG. 4b, a close-up view of which is shown in FIG. 4c. As can be observed, in such a configuration, the actuation pins 34 are still positioned inside the body 31, but along a circular arc 35, above which the shuttle 33 pockets 36 are positioned. The upward motion of the actuator 30 pins 34 is shown to be achieved by the detonation of one or more layers of the charges 37 provided in the space 38 under the selected actuator 30 pins 34, followed by the discharge of the pressurized gases and the pulling back of the actuator 30 pins 34 by the provided tensile spring element 39 as was previously described for the linear mechanical stepper motor (actuator) shown in FIGS. 1 and 2. The clockwise and counterclockwise rotation of the shuttle 33 is achieved in an identical manner by the sequential actuation of the actuating pins 34.

It is appreciated by those familiar with the art that the mechanical rotary stepper motor (actuator) shown in FIGS. 3a-3c may be fabricated for either full rotary actuation; as a circular arc to produce a desired (limited) range of angular rotation; or displacing a shuttle along a desired arbitrarily curved path.

It is also appreciated by those familiar with the art that all the aforementioned variations in the construction of the mechanical linear stepper motors (actuators), FIGS. 1-3, can be readily implemented on the above mechanical rotary stepper motors (actuators) shown in FIGS. 4a-4c.

It is noted that in the aforementioned linear and rotary mechanical stepper motor like actuators, the actuating pins 13 and 34, FIG. 1b and FIGS. 4b-4c, respectively, are integrated into (or the actuating pin assemblies are attached to) the body of the actuators. Here, the bodies 11 and 31 of the actuators, FIGS. 1a and 4a, respectively, are attached to the structure of the projectile (i.e., grounded or fixed), while the shuttles 12 and 16, FIGS. 1a and 4a, respectively, are moving relative to the bodies 11 and 31. It is, however, appreciated by those familiar with the art that alternatively, the actuating pins 13 and 34, FIG. 1b and FIGS. 4b-4c, respectively, may be integrated into (or the actuating pin assemblies be attached to) the body of the shuttles 12 and 16, FIGS. 1a and 4a, respectively. The pockets 18 and 36, FIGS. 1b and 4c, respectively, are then provided in the body of the actuators 10 and 30, FIGS. 1 and 4, respectively.

In the above embodiments, the actuators of FIGS. 1 and 4, the actuator pins 13 and 34, FIG. 1b and FIGS. 4b-4c, respectively, are shown to be biased by the provided tensile springs 15 and 39, respectively, to normally stay in their "pulled back" (disengaged from the shuttle) position. The upward motion of the actuator pins 13 and 34 are then achieved by the detonation of one layer of the charges provided under the actuator pins. The pressurized gases in the compartment under each actuator pin that drive the pin upward to engage the shuttle and cause it to move one step to the right or to the left is then discharged, thereby causing the actuator pin to be pulled back by the provided tensile spring element. The discharging of the pressurized gas may be achieved by the provision of exhaust vents 23 that are positioned such that in their resting position, the pins sealingly cover the vent hole(s) 23. Then once actuated, the pins pass the vent hole(s), thereby allowing the generated pressurized gases to substantially escape through the vent hole(s), thereby allowing the tensile return springs to return the pin to its resting position.

This method of venting the pressurized gases is very simple and does not require provision of directional valves of any kind. The resulting actuation system will also be very small and more reliable since it does not require additional components. The system will also not require external power to actively actuate switching valves.

In the above mode of operation, the actuation devices (linear and/or rotary) do not lock the shuttle to the actuator body, i.e., once the shuttle has moved a step to the right or to the left, since the actuating pin is retracted, the shuttle is held in place only by friction forces and by any external forces that tend to keep it in its new position. This would mean that if external forces are acting on the actuator, then the shuttle (rotor) may be pushed away from its new position. The system designer would then have the following two options for minimizing or eliminating the resulting positioning errors.

The first option is to provide an external brake to lock the shuttle to the actuator body. This is what is commonly done with electrical stepper (or other similar type) motors used to move an object to a specified position and keep the object in that position such as electric motors used in positioning stages, robotic arms and the like. This is generally done so that external power would not be required to keep the device in its prescribed position while external forces, including gravitational forces, are acting on the system. The braking of the motor, i.e., locking the device in its prescribed position, would also add to positioning accuracy of the system since external disturbances would not cause the device to be displaced from its prescribed position.

The second option is to use a servo (feedback) control system to continuously tend to move the shuttle closer to its prescribed position as external disturbances cause the shuttle to be displaced away from its prescribed position. Such an option is also commonly used in the art for various electrical and other types of linear and rotary actuation devices. However, when the shuttle (device being driven) is at times to be held in a prescribed position, this option would demand a considerable amount of power to operate. The latter energy that is consumed by the motor (actuator) does not amount to any useful work since in effect it is used to generate reaction forces that could have otherwise been generated by a braking device that would require a relatively small amount of electrical energy to actuate. The locking type actuation devices, if appropriate for the application at hand, are generally preferable since they lead to much simpler guidance and control systems.

The added advantage of the disclosed linear and rotary actuation devices is that they could be readily configured to operate as stepper motors with integral locking mechanisms. This is readily accomplished as follows.

Figure 5A:
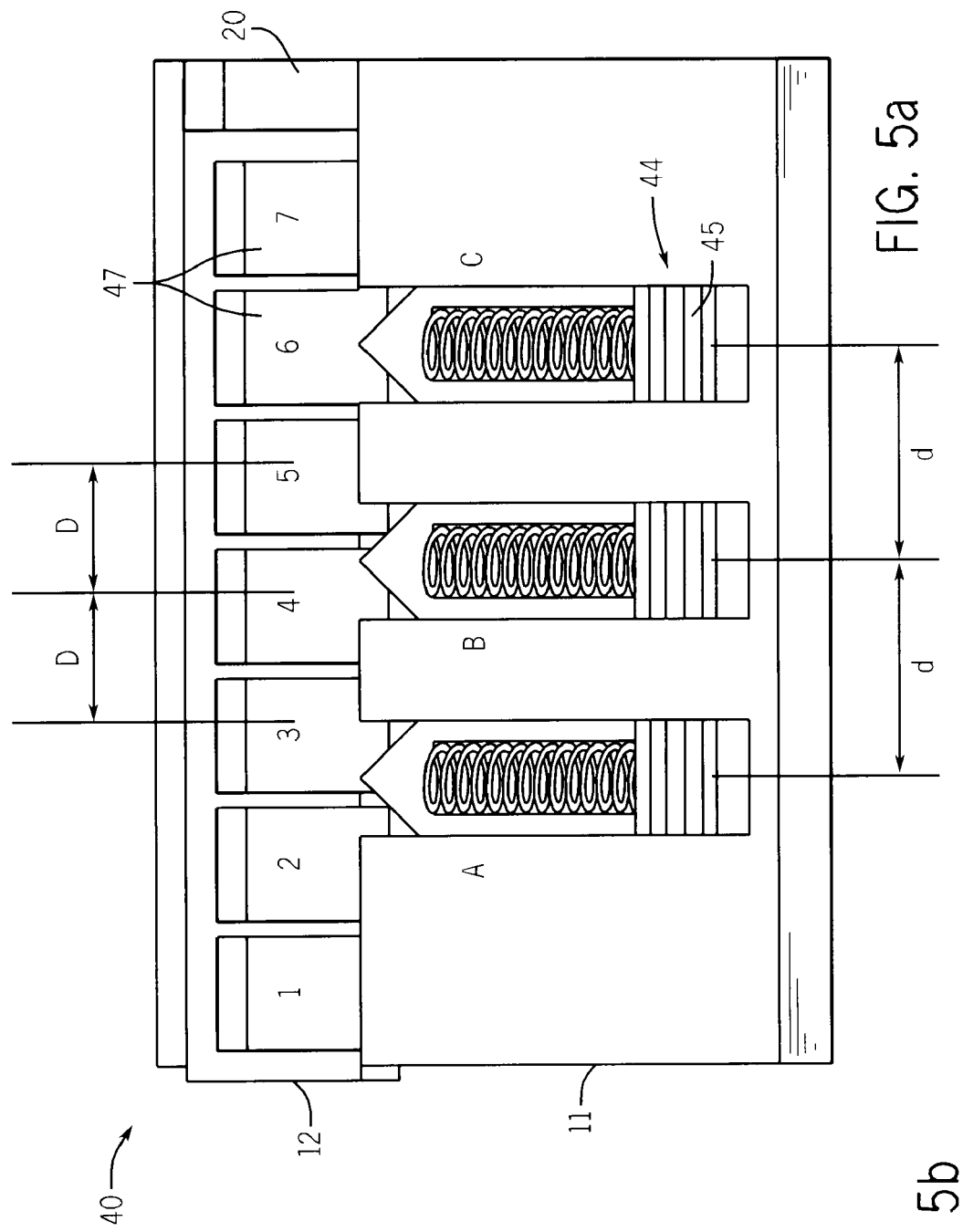
FIG. 5a illustrates a frontal cutaway view of the linear mechanical stepper motor like actuator of FIG. 1-3 with double acting actuating pins.
Figure 5B:
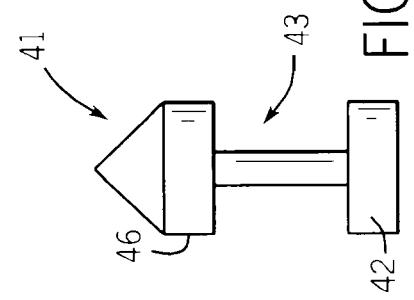
FIG. 5b illustrates a variation of a piston for use with the linear mechanical stepper motor of FIG. 5a shown without the spring.

Consider the disclosed linear mechanical stepper motor like actuator 10 shown in FIGS. 1-3. In this embodiment, the actuating pins 13 are biased downward by the tensile springs 15. As a result, following each actuation action, i.e., after an actuating pin 13 is pushed upward into the provided shuttle pocket 18, the return tensile spring 15 pulls the pin back into its rest position once the pressurized gases in the compartment 16 have been substantially vented through the provided venting holes (23) as described previously. The provision of the tensile return springs 15 actually allows the actuating pin 13 to act similar to a single acting pneumatic piston. The disclosed actuation devices 10 and 30, FIGS. 1 and 4, respectively, can however be transformed to stepper motor like actuation devices with integral position locking features with minimal modification. This is accomplished using either one of the following methods:

In the first method, the aforementioned tensile return springs 15 are removed and the actuating pins 13 are provided with the means to operate as a double acting pneumatic piston. In this embodiment 40, the actuating pins shown in FIG. 5a are replaced with actuating pins 41 as shown in FIG. 5b. Such actuating pins 41 can be designed with a piston 42 with a space 43 provided in the piston front as shown in FIG. 5b. In this embodiment, the detonation charges 45 provide the pressure to force the actuating pins 31 up to actuate the shuttle 12 to the right or to the left. No tensile return springs are provided. In addition, no vents are provided to discharge the pressurized gas. The pressurized gas would then keep the shuttle 41 locked to the actuator 40 body 11.

It is noted that as shown in FIGS. 1-3, the straight portion of the actuating pins 13 below their angled tips 22 fits inside the shuttle pocket 18, providing the means to resist further movement of the shuttle 12 relative to the actuator body 11, i.e., locking the shuttle 12 to the actuator body 11. In the embodiment 40 of FIG. 5, the actuating pin 41 is also provided with a straight portion 46 (cylindrical if the pin is cylindrical) so that when actuated, the straight portion 46 fits insider the shuttle pockets 47, thereby locking the shuttle 12 to the actuator body 11. The one actuated pin 41 is then retracted following the detonation of charges in a second pin chamber 44, which would also actuate and open a vent to allow the pressurized gases to escape from the first pin chamber 44, and pressurizing its frontal space 43 to force the first actuating pin 41 down into its rest position. This would effectively provide the means to allow the actuating pins 41 to act as double acting pneumatic cylinders. Such pneumatic valve systems to affect such pressurized gas routing are well known in the art and are not shown in FIGS. 5a and 5b.

In the second method, the tensile return springs 15, FIGS. 1-3, are retained. The pressurized gas vent holes 23 described for the embodiments of FIGS. 1-3 are, however, removed. As previously described, the detonation charges 17 will provide the force to push the actuating pins 13 up to actuate the shuttle 12 to the right or to the left. Since no vents are provided to discharge the pressurized gas, the pressurized gas would keep the shuttle 12 locked to the actuator body 11. The actuated pin 13 is then retracted following the detonation of charges 17 in the chamber 16 of a second actuating pin 13, which would actuate the said second actuating pin 13, and which would also actuate and open a vent to allow the pressurized gases to escape from the first actuated pin 13 chamber 16. The tensile return spring 15 will then retract the first actuating pin 13 to its rest position, thereby allowing the second actuating pin 13 to actuate the shuttle 12 to the right or to the left. This would effectively provide the means to allow the actuating pins 13 to act as single acting pneumatic cylinders with spring return mechanisms 15.

The latter embodiment constructed using the above second method can be simpler in design and does not require more complex valves to actuate the former double acting pin version design.

It is appreciated by those skilled in the art that the above shuttle 12 position locking feature (constructed using either one of the aforementioned methods) can be readily extended to rotary actuation devices (such as the one shown in FIG. 4) and even to actuating devices that provide almost any arbitrarily curved motions.

In the embodiments of the FIGS. 1-5, the pressurized gas used to actuate the actuating pins (13, 34 and 41 in FIGS. 1, 4 and 5, respectively) are generated by the detonation of charges that are stacked in the cavity below the actuating pins. In these embodiments, a number of individual charges (17, 37 and 45 in FIGS. 1, 4 and 5, respectively) are packed within the cavity and detonated on command to generate the required pressure within the cavity to actuate the actuating pins. This method of generating the actuation gas pressure is hereinafter referred to as "direct charge detonation method" or "direct method of pressure generation" inside a pin cavity to affect actuation.

The aforementioned actuating pressurized gases may, however, be generated within one or more separate "reservoirs" and then be routed via (e.g., pneumatic) valves to actuate the individual actuating pins upon command. The "reservoir" preferably accommodates enough pressurized gas to actuate the pins a number of times. This method of generating the pressurized actuation gases for operating the said actuating pins is hereinafter referred to as "indirect charge detonation method" or "indirect method of pressure generation".

The aforementioned direct and indirect methods of generating pressurized gases for the operation of the actuating pins each has certain merits and shortcomings, generally depending on the selected application. The following is a short list of potential advantages and disadvantages of each one of the above methods, particularly for munitions applications.

The following is a number of potential advantages and disadvantages of the aforementioned direct method of pressure generation for the operation of the said actuating pins as compared to the aforementioned indirect method of pressure generation:

For munitions applications or in devices used for emergency use in which the number of steps that the actuator has to move during its entire actuation cycle is rather limited, the direct method of actuation pressure generation is usually more suitable since it would lead to a less complex device and it would occupy less volume. In addition, the resulting actuators do not require actuation valves for their operation.

The direct method has the advantage of not requiring a pressure reservoir, which would occupy certain amount of volume depending on the number of steps is desired to be provided in between "charging" of the reservoir via detonation of individual charges.

The direct method has the advantage of being able to provide very high localized pressure, thereby being capable of providing very high pin actuation forces and as a result, very high actuation forces and torques.

One disadvantage of the direct method is that since the required direction of actuation (to the right or left for linear and clockwise or counterclockwise for rotary actuators) are not known a priori, therefore the pin cavities have to be stacked with a significantly larger number of detonation charges that might be needed to ensure their availability during any operational scenario.

The following is a number of potential advantages and disadvantages of the indirect method of pressure generation for the operation of the said actuating pins as compared to the aforementioned direct method of pressure generation:

The main advantage of the indirect method is that the pressurized gases used to operate the actuating pins are generated in one or more reservoir and then distributed to the acting pin. In this method, the space required to house detonation charges for each individual pin and their initiation devices and wiring are eliminated. Fewer detonation charges providing relatively larger volumes of pressurized gas can be used to power several actuation steps at a time.

The actuator using this method requires pneumatic valves to route the pressurized gases to individual actuating pins. These valves can, however, be one-way pneumatic valves, which can be very simple and very low power to operate.

The potential disadvantage of indirect method is that it may lead to a slightly larger overall volume than direct method based actuation devices. In addition, the actuating gas pressure will generally be lower than those possible with the direct method. However, the additional volume can be minimized by also integrating the reservoir into the structure of the projectile.

Figure 6A:
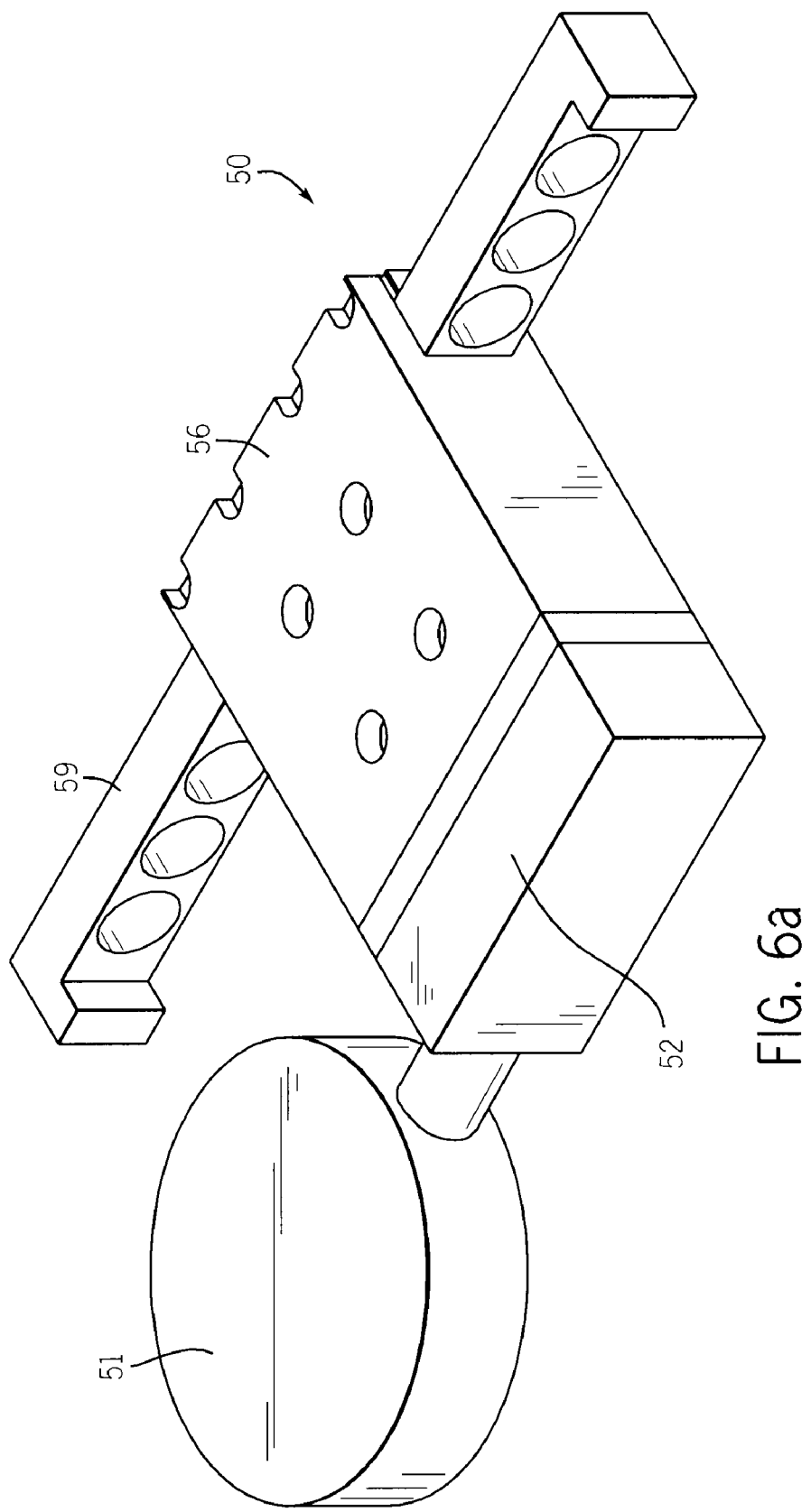
FIG. 6a illustrates an overall view of a linear mechanical stepper motor like actuator with a side combined pressurized gas reservoir and gas generating detonation charge unit.
Figure 6B:
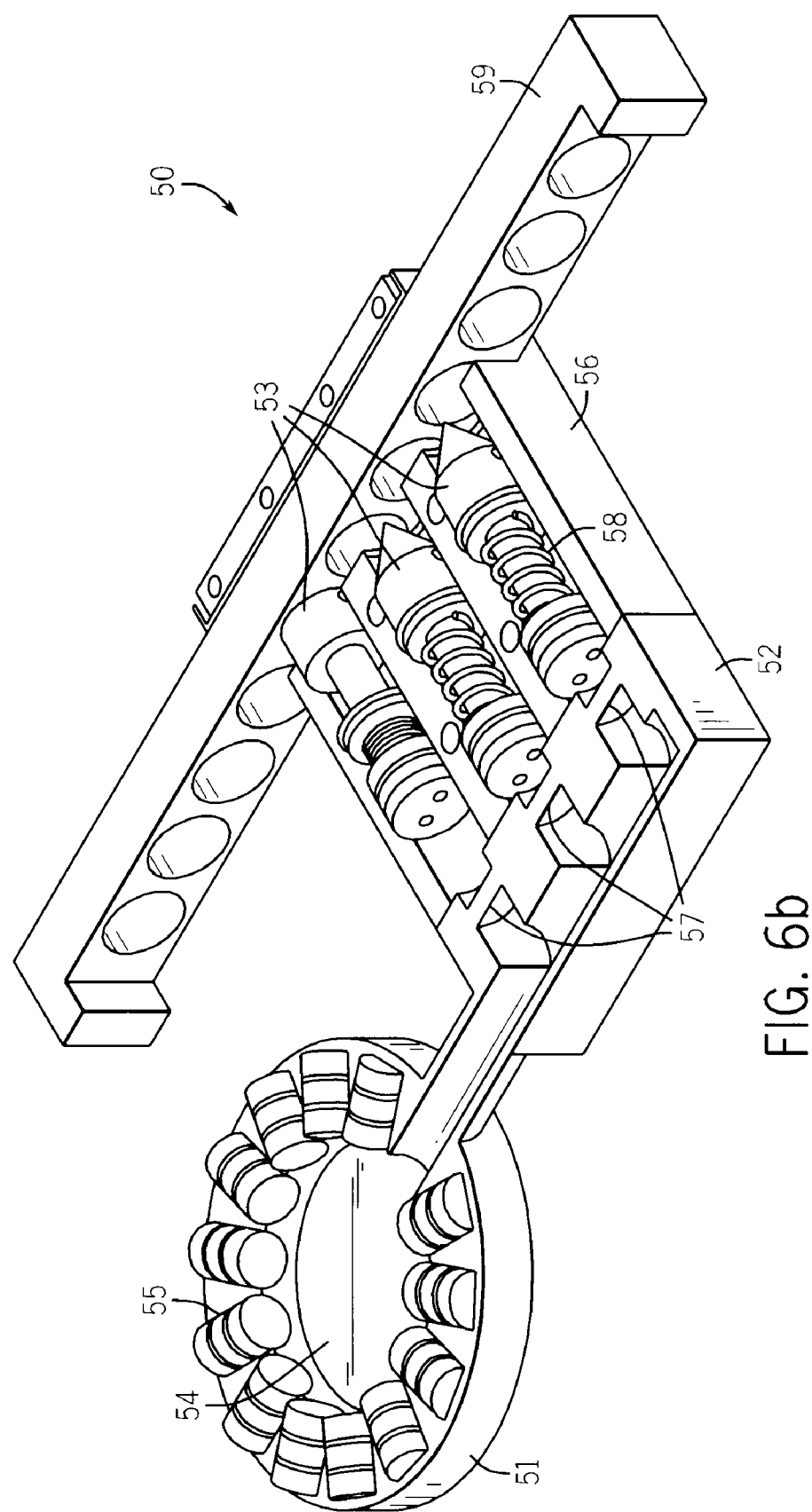
FIG. 6b illustrates a cut-off view of the linear actuator of FIG. 6a showing the pressurized gas chamber and the gas generating charges and other components of the actuator.

FIG. 6a illustrates the overall view of a typical linear actuator embodiment 50 operating based on the aforementioned "indirect charge detonation method" or "indirect method of pressure generation". The cutaway view of the actuator embodiment 50 showing the internal components of the actuator is shown in FIG. 6b. In this embodiment, the actuating pressurized gases are generated within at least one "reservoir" unit 51 and are then routed via control valve unit 52 to actuate the individual actuating pins upon command to the individual actuating pin 53 valves 57 as previously described. The at least one "reservoir" unit 51 can accommodate enough pressurized gas to actuate the actuating pins 53 a number of times.

In the embodiment 50 of FIGS. 6a and 6b, the reservoir unit 51 consists of a pressurized gas reservoir 54 and at least one (single or stack of several individually detonated) pressurized gas generating detonation charges 55 and the shuttle 59. In this embodiment, when the pressure in the gas reservoir 54 drops below a specified level, one of the separate charges 55 (a total of 39 such individual detonation charges are shown in FIG. 6b) is initiated to replenish the reservoir 54. This allows the linear mechanical stepper motor like actuator 50 to operate with much higher efficiency because the constraint of charge allocation in a given cylinder in actuators using the aforementioned direct method of pressurized gas generation, FIGS. 1-5, is removed. Such a design could obviously accommodate significantly larger number of charges and allow a significantly number of actuation steps. Additionally, optimization of the design based on the parameters of reservoir 54 volume, volume occupied by the detonation charges 55, reservoir pressure, and the desired actuating pin 53 operating pressure will yield very high compactness for the device.

The actuating pins 53 may be single acting with tensile return springs 58 as shown in FIG. 6*b*, or may be double acting as described for the embodiment of FIG. 5*b*. In either case, by a proper sequence of operation of an actuating pin 53 valve 57, the shuttle 59 may or may not be locked to the body 56 of the actuator 50 as previously described.

In the embodiment 50 shown in FIGS. 6*a*-6*b*, the actuator body 56 and the pressurized gas reservoir 54 are can be integral and/or load bearing parts of the projectile structure. The pressurized gas chamber may be positioned as shown in FIGS. 6*a* and 6*b*, or positioned in any other position and direction to accommodate the design of the projectile structure.

FIG. 7*a* illustrates an overall view of another embodiment 60. FIG. 7*b* shows a cutaway view of the embodiment 60 showing the internal components of the mechanical stepper motor like linear actuation device. The actuator embodiment 60 is similar in construction and operation to the mechanical stepper motor like linear actuator with double acting actuation pins shown in FIG. 5, with the main difference being the positioning and method of storing the actuating detonation charges. The actuator 60 has an actuator body 61 and a shuttle 62 with shuttle pockets 63, FIGS. 7*a* and 7*b*. The actuator body 61 is provided with at least one "driving charge" chamber 64 and at least one "return charge" chamber 65 within each of which at least one detonation charge 68 is provided, FIG. 7*b*.

The linear actuator 60 is constructed with at least three double acting actuating pins 69 (cylinders), with both actions powered by detonation of the indicated charges, one driving charges 68 in at least one chamber 64 to drive the actuation pin 69 to actuate the shuttle 62, and one return charges 68 in at least one chamber 65 to retract the actuating pin 69 away from the shuttle 62 as shown in FIG. 7*b*. The actuating pins 62 are provided with the piston 67 to allow the pressurize gases generated by charges in the at least one chamber 64 to push the actuating pin 69 forward to engage the shuttle 62 pockets 63 and drive the shuttle 62 to the right or to the left. The actuating pins 62 are also provided with a smaller sized middle portion 71 to allow the formation of a chamber 70, thereby allowing the pressurize gases generated by charges in the at least one chamber 65 to push the actuating pin 69 back to engages the shuttle 62 pockets 63.

It is appreciated by those skilled in the art that the aforementioned "driving charge" and "return charge" chambers may be positioned as shown in FIG. 7*b*, or be positioned in any other direction to accommodate the design of the projectile structure. Such a design could obviously accommodate significantly larger number of charges for a given length of the actuating pin 66 assembly.

It is appreciated by those familiar with the art that the linear mechanical stepper motor like actuator shown in FIGS. 7*a* and 7*b* may also be constructed as a rotary actuator similar to that shown in FIG. 4, and in fact as a mechanical stepper motor like actuator providing an arbitrarily curved motion.

In the embodiments shown in FIGS. 1-5, the gas pressure used to displace the actuation pins were shown to be generated by the detonation of charges that are stacked in the cavity below the actuating pins. In this design, a number of individual charges are packed within the said cavity and detonated on command to generate the required pressure within the cavity to actuate the actuating pin.

In alternative embodiments, the stacked (or individual) charges may be positioned outside the actuation pin chamber as shown for the at least one "driving charge" chamber 64 housing the detonation charges 68 in the embodiment 60 shown in FIG. 7*b*. The generated pressure is then channeled directly (as shown in FIG. 7*b*) or through provided passages to actuate the actuating pins. The main advantage of such a detonation charge storage arrangement is that it would allow a significantly larger number of detonation charges to be provided without making the actuation pin assemblies very long.

The embodiments shown in the FIGS. 1-7 are actuated by pressurized gases generated by detonation charges. Such actuation devices are particularly appropriate for applications in gun-fired projectiles, mortars, missiles and other applications in which the actuator is required to operate for a limited and relatively short period of time, and also when very high actuating forces/torques are to be generated by direct detonation of indicated charges.

Figure 8:
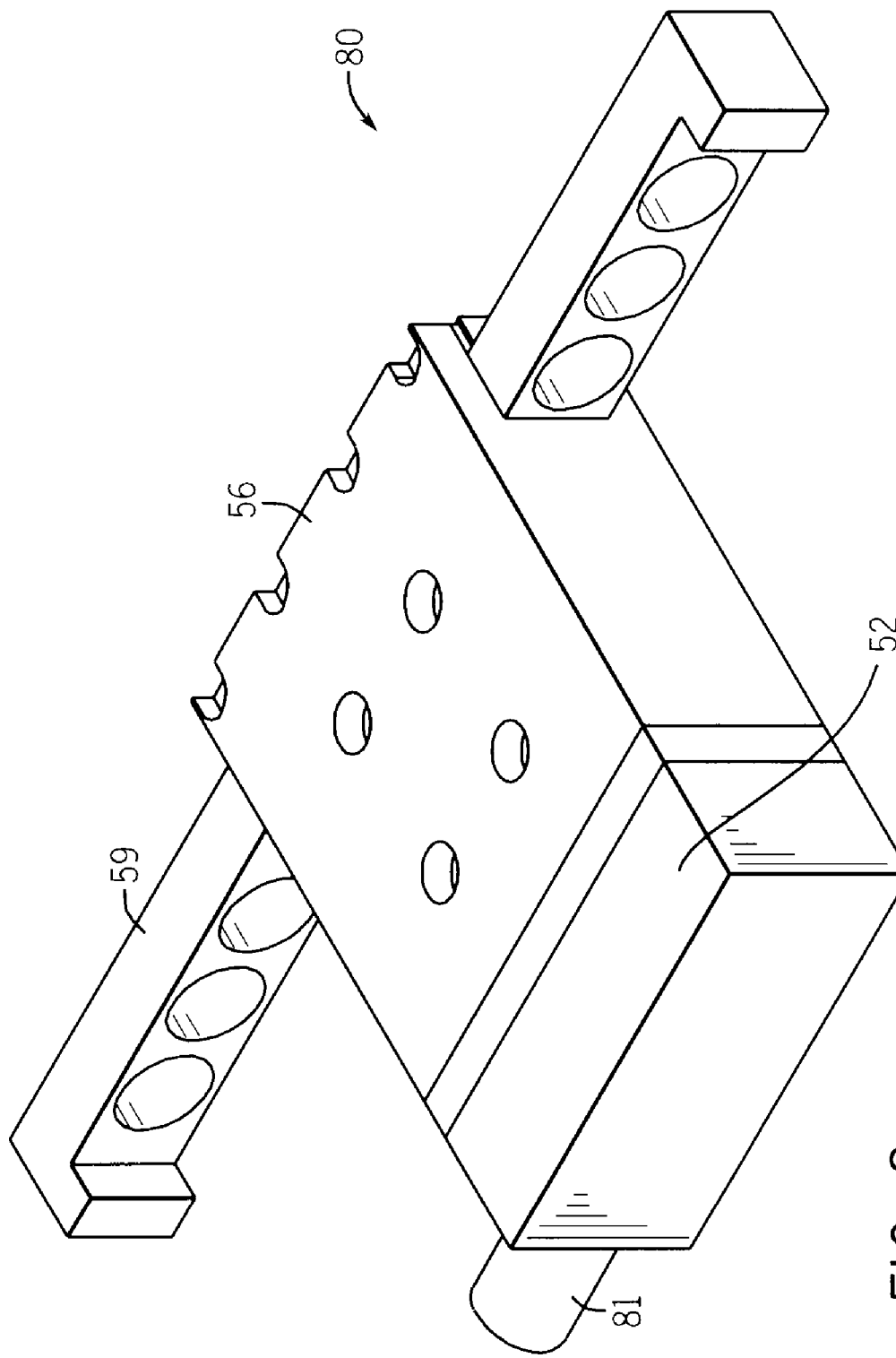
FIG. 8 illustrates an overall view of a pneumatic linear mechanical stepper motor like actuator obtained by replacing the external reservoir unit of the embodiment shown in FIGS. 6a and 6b.

Alternatively, pressurized gas (such as air) or fluid (such as hydraulic fluids) may be provided from external sources and used to drive the disclosed linear and rotary mechanical stepper motor like actuation devices such as those shown in FIGS. 1-7. As an example, the embodiment 50 shown in FIGS. 6*a* and 6*b* is redrawn as the linear mechanical stepper motor like actuator 80 in FIG. 8, with the reservoir unit replaced with at a simple pneumatic inlet 81 through which pressurized gas (such as air) is supplied for the actuation of its actuating pins. The remaining components of the actuator embodiment 80 are the same as those of the embodiment 50 shown in FIGS. 6*a* and 6*b*. The pressurized gas operating this actuator can be air and can be provided by an external source (not shown). The main advantage of this mechanical stepper motor like actuator is that it could be operated without any number of step limitations.

It is appreciated by those familiar with the art that all the linear and rotary mechanical stepper motor like actuators described in this disclosure, including those shown in FIGS. 1-7, may be similarly designed to operate pneumatically with pressurized air (or other gases). Such pneumatic mechanical stepper motor like actuators are best suited for applications in which they are to be operated for relatively long periods of time. The resulting pneumatic mechanical stepper motors like actuators are more suitable for non-munitions applications, particularly for production type machinery. The resulting pneumatic actuators may be operated as previously described with or without step position locking feature. The mechanical stepper motors described herein can also operate without actuation by pressurized gas (other means for actuation), such as by hydraulic actuation of the pins. Hydraulic activation is well known in the art, such as in hydraulic actuator cylinders.

It is noted that the aforementioned pneumatic linear and rotary mechanical stepper motor like actuators may operate with the aforementioned single-acting (spring return) or double-acting actuation pins. In certain applications, such as when high external dynamic forces are experienced by the actuation device, double-acting actuating pins and/or step position locking features may be required to achieve necessary performance. The additional logic and plumbing for a double-acting and/or step position locking designs is well known in the art, and the overall compactness of the device will not change dramatically.

Referring now to FIGS. 9a-9b, there is shown an exemplary configuration of a mechanical stepper motor integrated into the structure of a projectile 90. In the exemplary configuration of FIGS. 9a-9c, the mechanical stepper motor is of a rotary configuration, such as that shown and described with regard to FIGS. 4a-4c (referred to with reference numeral 30) and the same is used to control a control surface of the projectile 90, which in the exemplary configuration of FIGS. 9a-9c is a canard 92. The guide 32 of the rotary mechanical stepper motor is integrated into one of the nose cone 94 or body 94 of the projectile 90 and the shuttle 33 is allowed to freely rotate within the nose cone 94. A portion of the shuttle 33 carries a geared surface 98 which is provided to mesh with a rotatable gear 100. The canard 92 includes a shaft 102 connected to the gear 100. Thus, rotation of the shuttle 33 in turn rotates the gear 100 which in turn rotates the canard 92 to control the projectile as desired.

Although shown with regard to varying a control angle of a canard 92, the disclosed mechanical stepper motors, linear and/or rotary, can be used to control other features of projectiles, deploy features from projectiles (e.g., wings or other control surfaces) and/or vary an outer surface shape and/or dimension of the projectile (see e.g., U.S. Pat. Nos. 6,727, 485; 6,923,123; 6,982,402; 6,935,242 and 7,150,232; the contents of each of which are incorporated herein by reference).

As discussed above, the mechanical stepper motors disclosed herein can be stacked in parallel (e.g., two linear mechanical stepper motors stacked in parallel, one or which for a coarse adjustment and one for a fine adjustment; two linear mechanical stepper motors placed orthogonal to each other to create and X-Y table; three linear mechanical stepper motors each placed orthogonal to another to create an X-Y-Z table; one, two or three linear mechanical stepper motors as described immediately above having a rotary mechanical stepper motor at one or all of the X, Y or Z axes) and/or in series (any combination of linear and/or rotary mechanical stepper motors placed in series so as to customize for any conceivable complex motion).

Lastly, although in the embodiments in which the pin is biased, it is biased on the unengaged position, the pin can also be biased in the engaged (locked) position and the charge (or other activation means) can be used to disengage the pins. Furthermore, some pins can be in the normally engaged position and disengaged with a charge (or other activation means) to free the carriage at which point other normally disengaged pins are engaged with a charge (or other activation means) to change the position of the carriage, at which point the normally engaged pins can re-engage (e.g., pressure vented) to lock the carriage in the new position.

The mechanical stepper motors and actuators disclosed above have widespread commercial use in robotics and automated manufacturing in general and in semiconductor manufacturing in particular. As semiconductor devices become increasing complex and the density of components contained on semiconductors increases, there is an urgent need for precise control of the automated equipment for manufacturing the semiconductor wafers. The proposed novel mechanical stepper motors and actuators can provide such precise control. For example, during the mask-making process of a semiconductor wafer, the mechanical stepper motors and actuators can be used to precisely drive a laser or electron beam to selectively remove chromium and create the mask.

The mechanical stepper motors and actuators disclosed above also have widespread commercial use where sanitary conditions are necessary, such as in the food industry. Because the mechanical stepper motors and actuators disclosed above do not require electrical coils (as do electric stepper motors), they can be washed down to meet FDA standards for certain food manufacturing processes.

The mechanical stepper motors and actuators disclosed above also have widespread commercial use in emergency situations that may require a large generated force and where a one time use may be tolerated. For Example, the mechanical stepper motors and actuators disclosed above can be configured to pry open a car door after an accident to free a trapped passenger or pry open a locked door during a fire to free a trapped occupant. By using a large explosive force, the novel mechanical stepper motors and actuators disclosed above can generate a very large force and the one time use of the device can be tolerated in emergency situations.

While there has been shown and described what is considered to be preferred embodiments of the invention, it will, of course, be understood that various modifications and changes in form or detail could readily be made without departing from the spirit of the invention. It is therefore intended that the invention be not limited to the exact forms described and illustrated, but should be constructed to cover all modifications that may fall within the scope of the appended claims.

What is claimed is:

1. A projectile comprising:
  a body having an internal space; and
  a mechanical stepper motor disposed in the body, the mechanical stepper motor comprising:
    a shuttle having one of a plurality of pockets and movable pins offset from each other with a first spacing;
    a body portion having the other of the plurality of pockets and movable pins offset from each other with a second spacing, where the first spacing is different from the first spacing; and
    actuation means for engaging at least one of the movable pins into a corresponding pocket to step one of the shuttle and body portion a predetermined linear and/or rotary displacement.

2. The projectile of claim 1, wherein the mechanical stepper motor is disposed in the internal space.

3. The projectile of claim 1, wherein the mechanical stepper motor is provided on the body.

4. The projectile of claim 1, wherein a portion of the mechanical stepper motor is integral with the body.

5. The projectile of claim 1, wherein the mechanical stepper motor is operatively connected to a portion of the body.

6. The projectile of claim 5, wherein the portion of the body is a control surface and the mechanical stepper motor is operatively connected to control the control surface.

7. The projectile of claim 6, wherein the control surface is a canard.

8. The projectile of claim 1, wherein the predetermined displacement is linear.

9. The projectile of claim 8, wherein the body portion comprises a shuttle guide for movably holding the shuttle and pin guides for movably holding the pins.

10. The projectile of claim 1, wherein the predetermined displacement is rotary.

11. The projectile of claim 10, wherein body portion comprises pin guides for movably holding the pins and the shuttle is rotatably disposed on the body portion and comprises the pockets.

12. The projectile of claim 1, wherein the activation means comprises one or more detonation charges for producing a pressurized gas acting on at least one of the pins to one of engage and disengage the pins with a pocket.

13. The projectile of claim 12, further comprising a biasing means for biasing the at least one pin in a disengaged position, wherein the activation means further comprises a vent hole for releasing the pressurized gas from acting on the pin and allowing the biasing means to disengage the at least one pin from the pocket.

14. The projectile of claim 12, wherein the one or more detonation charges are provided in a space in direct communication with a portion of the at least one pin.

15. The projectile of claim 12, wherein the one or more detonation charges are provided to pressurize a reservoir in fluid communication with a portion of the at least one pin through one or more valves.

16. The projectile of claim 1, wherein the actuation means comprises one or more of the pins having a first portion acted upon by a first pressurized gas to engage the one or more pins and a second portion acted upon a second pressurized gas to disengage the one or more pins.

17. The projectile of claim 16, wherein the first pressurized gas is provided by one or more first detonation charges and the second pressurized gas is provided by one or more second detonation charges.

18. The projectile of claim 17, wherein the first and second detonation charges are disposed in the body.

19. The projectile of claim 1, wherein the activation means comprises a pressurized fluid source in fluid communication with a portion of the at least one pin through one or more valves.

20. The projectile of claim 19, wherein the pressurized fluid source is one of air and hydraulic fluid.

21. The projectile of claim 1, further comprising locking means for locking a position of one of the shuttle and body relative to the other.

* * * * *